United States Patent [19]

Morris et al.

[11] 4,001,814
[45] Jan. 4, 1977

[54] FIXED FORMAT MESSAGE ENTRY DEVICE WITH ELECTRONIC STORAGE AND EDITING

[75] Inventors: Derek S. Morris, Allenhurst; Robert M. Braun, Eatontown, both of N.J.

[73] Assignee: The United States of America as represented by the United States Secretary of the Army, Washington, D.C.

[22] Filed: May 21, 1975

[21] Appl. No.: 579,643

[52] U.S. Cl. .......................... 340/365 R; 178/17.5; 178/26 A
[51] Int. Cl.² ........................................ G08C 1/00
[58] Field of Search .......... 340/365; 178/17, 17.5, 178/26 R, 26 A

[56] References Cited
UNITED STATES PATENTS

| | | | |
|---|---|---|---|
| 3,014,093 | 12/1961 | Zenner | 178/17.5 |
| 3,187,321 | 6/1965 | Kameny | 340/365 R |
| 3,200,375 | 8/1965 | Lutz | 340/365 R |
| 3,394,368 | 7/1968 | Carr et al. | 340/365 R |
| 3,670,322 | 6/1972 | Mallebrein | 340/365 C |

Primary Examiner—Marshall M. Curtis
Attorney, Agent, or Firm—Nathan Edelberg; Jeremiah G. Murray; Daniel D. Sharp

[57] ABSTRACT

A fixed format message entry device employs a solid state memory for storing data. A portable keyboard is provided to input data to a display that is packaged with the keyboard and associated electronics. The display is comprised of an array of light emitting diodes operating with fiber optics. Overlay cards have openings, through which the light emitting diodes pass. Printed codes appear on the cards, next to respective fiber optics thus facilitating the interpretation of a display, by an operator.

11 Claims, 6 Drawing Figures

FIXED FORMAT MESSAGE ENTRY DEVICE WITH ELECTRONIC STORAGE AND EDITING

RIGHTS OF THE GOVERNMENT

The invention described herein may be manufactured, used, and licensed by or for the United States Government for governmental purposes without the payment to us of any royalty thereon.

FIELD OF THE INVENTION

The present invention relates to data entry systems, and more particularly to a keyboard-display portable unit which permits the rapid entry of data by an operator into a memory, and read out from the memory to an output terminal that permits communication of the data to a remote location.

BRIEF DESCRIPTION OF THE PRIOR ART

Advances in the state-of-the-art in computer technology have led to military requirements for the remote entry of data into a central processing unit (CPU) via radio or wire links. At first these requirements called for simple devices that could enter a few numerals and alphabet characters into such a system. The data entry portion of these requirements could be easily satisfied by arrays of multiple position switches where the switches served as both an entry and memory device.

A device has been built that uses an array of switches for an entry and storage means. This device, called a Fixed Format Message Entry Device (FFMED) employed 30 rotary switches, each position-coded by means of numbers. These numbers are used to represent specific data which are correlated with the numbers by a book of tables. This FFMED has a serious drawback that is a direct result of using switches to handle the large density of data, namely, it is slow. The operation of the device is slow primarily because the operator must use the tables to cross-reference the numbers indicated by the switches to actual data. In addition, it is difficult to make a mechanical switch mechanism that is rugged enough to withstand the tactical field environment where the equipment is employed, and also small and reliable enough to be used in arrays that are large enough to handle the required amount of data. This prior art clearly demonstrates that there is a definite limitation to the use of mechanical switches.

Anyone who is familiar with computer technology will realize that these limitations may be overcome by replacing the switches with a keyboard, addressable memory and electronic display. However, two not-so-obvious problems are associated with this approach. The first is that the amount of power consumed by the memory and associated logic in common use today is too large for the device to be battery operated. The second is that a satisfactory method of displaying many code abbreviations had not been determined. Devising a satisfactory method is a significant task.

BRIEF DESCRIPTION OF THE PRESENT INVENTION

The present invention relates to a device that demonstrates a solution for the problems of the prior art. A specially packaged portable unit has been constructed which includes a conventional keyboard and associated electronics which permits the storage of entered data. A novel display, using light emitting diodes-fiber optics, in columnar fashion creates a visual display requiring low power. Further, removable overlay cards are mounted over the fiber optics display so that printed codes appear next to respective fiber optics thereby rendering immediately intelligible information to the operator. An output connector is provided at the output of the display so that the entered data may be communicated to a remote location.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
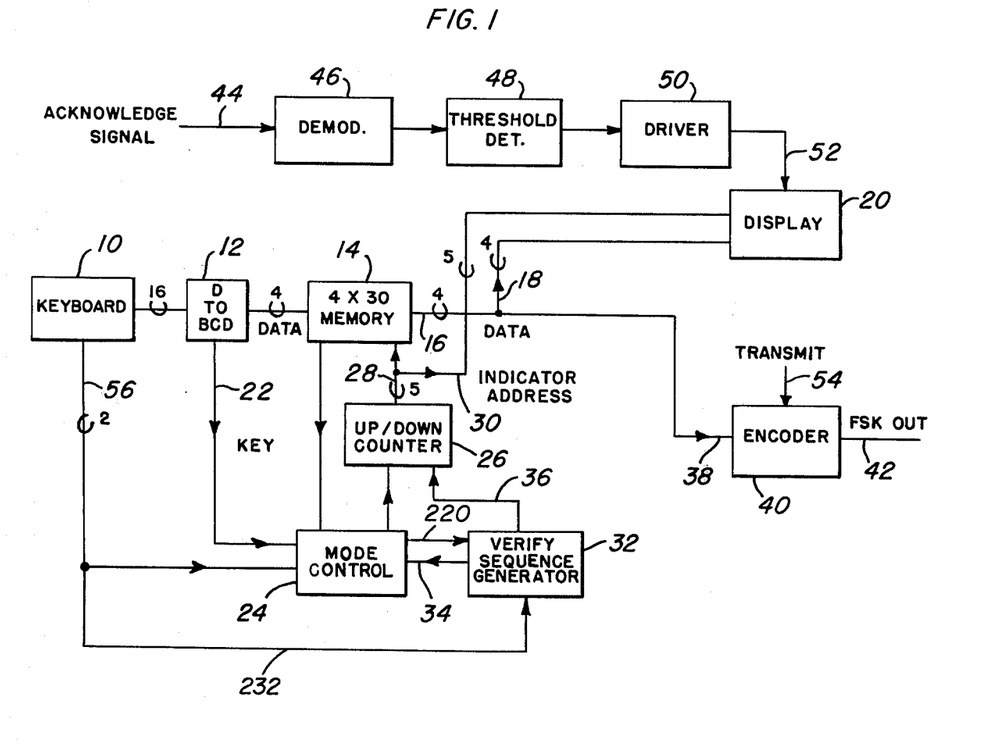
FIG. 1 is a block diagram of the present invention.

Referring to the figures, and more particularly FIG. 1 thereof, a keyboard 10 is provided for the manual entry of data into the data entry terminal of the present invention. The keyboard is of conventional construction utilizing switch closures to initiate data entry. The keyboard 10 produces a unique closure to a common output line for each data key. In an illustrative application of the present system, 16 input characters (0–15) are used. Thus, a 4 bit format is used for each of the sixteen input characters. This is indicated on the line connecting keyboard 10 and converter 12. The converter may typically be a conventional diode matrix which converts the decimal entry of the keyboard to binary coded decimal (BCD). A 4 bit BCD character is generated by converter 12, and may represent any of the 16 character conditions (0–15), as entered by the keyboard 10. The 4 bit representation of each key entry is entered into memory 14 which is organized to accept the 4 bit parallel input from converter 12. The memory will output a 4 bit representation during a read out cycle. The memory is capable of storing 30 characters, each having 4 bits. However, it must be stressed that the particular number of bits used as well as the number of characters used are with reference to a constructed embodiment of the present invention. However, there is no implied or actual restriction to these numbers, for purposes of this patent application.

A second output line 22 is connected between the converter 12 and a mode control circuit 24. When normal data is being entered into the keyboard 10, the mode control 24 increments an up/down counter 26, which is turn increments the memory 14 to sequentially spaced addresses. This is indicated by line 28. The counter 26, which is of conventional design has a further line 30, connected to the output thereof, which forms a second input to the display 20. As each character is entered in keyboard 10, the indicator address changes so that a corresponding light emitting diode (LED) and connected fiber optics is lit in the display. Otherwise stated, as data is entered on the keyboard, various sections of the display are sequentially lit. Data from memory 14 is communicated along lead 18.

When all the characters are entered in keyboard 10, and are thus stored in memory 14, the data in memory may be verified. This is accomplished by changing the condition of the mode control 24 which causes the display 20 to cooperate with memory 14 and strobe the stored data for purposes of displaying the same. A circuit referred to as a verify sequence generator 32 is utilized to control this operation through output leads 34 and 36. At any time during data entry, should it be desirable to review a particular character that has been entered, means are provided on the keyboard 10 for accomplishing this end. Separate directional keys are provided to generate unique characters at line 56 which is fed to the mode control 24. The mode control then steps the counter 26 either up or down in a manner responsive to the particular directional key depressed on the keyboard.

During a verifying sequence when generator 32 is active, the mode is changed to automatically strobe five adjacent characters, loaded in memory, first upwardly then downwardly and repeatedly. This causes a visual indication of five adjacent locations in memory on the display 20. The verify sequence generator 32 has an output indicating a five character output which permits the upward and downward strobing of five adjacent locations in memory 14. However, as previously mentioned, this number of characters is merely illustrative of a particular embodiment of the invention.

After all data has been entered into memory 14, and the data is displayed at 20 as the data is entered, an additional capability of transmitting the stored data is made available. This will be seen in FIG. 1 by the connection of output lead 16 from memory 14 to the encoder 40, at input 38 thereof. The encoder is of conventional design and may be fabricated from CMOS array logic to minimize power consumption. The output from the encoder may typically provide a FSK output at 42. An enabling control signal at 54 initiates a transmit mode. As will be appreciated, any appropriate scheme for communicating the data output to a remote station may be applicable to the invention.

Once a remote location has received data, it is desirable for the present terminal to be informed of this. Accordingly, an acknowledge signal generated by a remote location is processed by special circuitry and displayed to an operator. As seen in FIG. 1, an acknowledge signal from a remote location is applied to the input 44 of a demodulator 46. The demodulator output feeds a threshold detector 48, such as a Schmitt trigger which thus generates an output pulse when a signal of sufficient amplitude is received, representing a valid acknowledge signal. A lamp driver 50 becomes energized when such a signal is received and through lead 52 causes an indicator to be lit, thus signifying the occurrence of an acknowledge signal.

Figure 2:
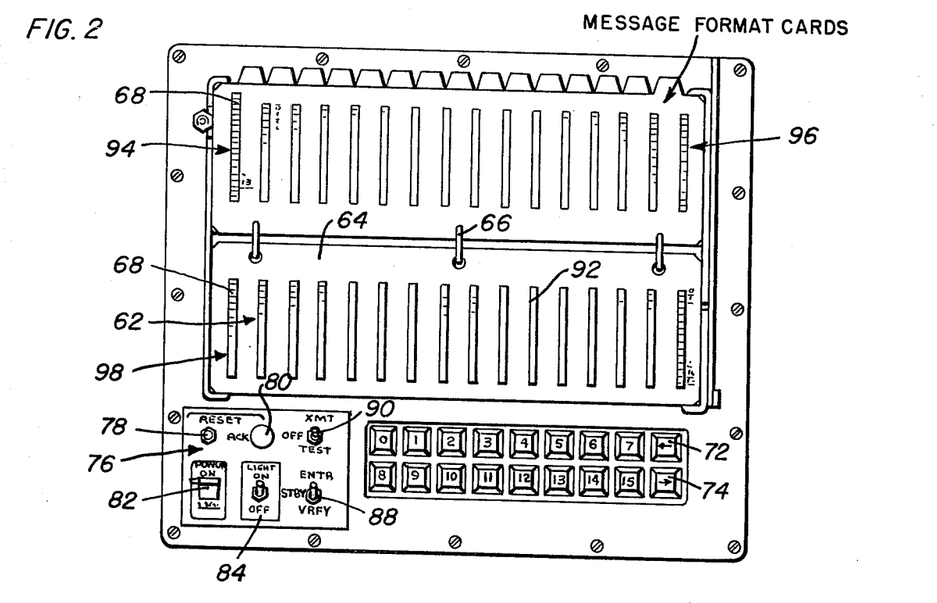
FIG. 2 is a top plan view of a message entry device as incorporated in the present invention.
Figure 3:
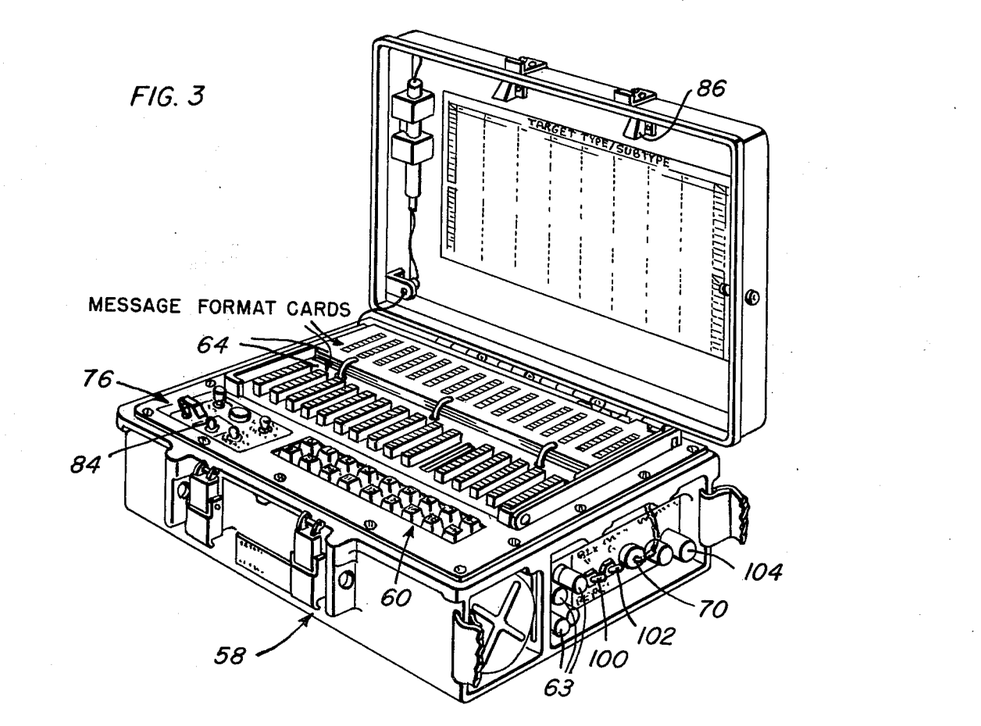
FIG. 3 is a perspective view of the device shown in FIG. 2.

In order to better appreciate the subject matter of the present invention, reference is made to FIG. 3 which shows a perspective view of the present terminal. Generally, a housing 58 is provided that lends itself to portability and rugged construction. A keyboard as previously discussed is indicated at 60. A number of columnar LED-fiber optic assemblies 62 are arranged in parallel spaced relation. Each of the light assemblies includes a number of adjacent light indicators that correspond with the keyboard keys. Message format cards 64 overlay the individual LED-fiber optic assemblies and present printed matter for each fiber optic indicator, so that the operator knows what the indicator signifies. The functional operation of the terminal is discussed below, with reference to FIGS. 2 and 3.

FUNCTIONAL OPERATION OF THE TERMINAL

The device operates in the following way. The operator observes the front panel which is dominated by a notebook of white format cards 64 mounted by rings 66, with rectangular blocks 62, which are the light assemblies, protruding through. Viewing FIG. 2, each of these blocks consists of 16 segments 68 of ⅛ inch + ⅛ inch glass fiber optic material bonded together to form a 2 inches × ⅛ inch fiber optic indicator. Below each indicator, but not visible to the operator, are 16 LED's that illuminate the top surface of the block one segment at a time when the device is operated. Each segment has a number (0-15) stenciled on its top surface which corresponds to the same number (or a corresponding word) printed on the format card adjacent to the segment. Thus, when a given segment on a light block is illuminated, it means that the right hand adjacent number or word on the format card is being displayed. Most of the data in the system is numerical so that in a majority of instances, the data may be read directly from the stenciled number on the top of the light block.

The first thing that must be done to operate the device is to pick the appropriate format card 64. The operator does this either with his finger or by using the spade end of a tool to select and lift the appropriate index tab and flip the cards. The name of each card is indicated on its face.

The next most prominent feature of the front panel is the keyboard 60. It consists of data keys and two reverse-forward address controls 72, 74. To the left of this keyboard 60 are the function switches 76 which provide the main control of the device. These function switches are formed in two groups. The first is a reset button 78 and light 80 that provide the acknowledge function, that is an indication of when a transmitted message has been received by the system. The second group consists of a power switch 82 that controls the power from a battery to the entire device, a light switch 84 that controls power to lights 86 (FIG. 3) in the front cover that are used to illuminate the front panel at night, a switch 88 with positions labeled "ENTR," "STBY" and "VRFY" used to control the entry and verification of data and a switch 90 with positions labeled "XMT," "OFF", and "TEST" used to transmit actual or test data. There are other switches located on the right hand side of the case, but they do not control the basic functioning of the device.

If the power switch 82 is turned on, a "power up" cycle will occur. This will cause zero's to be written in each address within the memory 14 (FIG. 1). This cycle will only occur if the voltage across the memory has fallen to a value just above that necessary to retain memory. If the switch 88, referred to as a mode switch, is in the enter data position (ENTR) or verify position (VRFY) before the power switch is turned on, the cycle will always occur and be visible on the display. If the power switch 82 is switched off and the mode switch 88 is in the standby (STBY) position, the device will store data for about 30 seconds before it will be erased by a "power up" cycle when the power switch 82 is subsequently turned on.

If the mode switch 88 is in the ENTR position during and after the "power-up" cycle is completed, the "zero" in an indicator block 92 will be illuminated. It is located there, as are the next four indicator blocks to the right of it so that header data may be entered and stored prior to a specific mission. The first entry of actual data occurs with indicator block 94 which is located in the upper left portion of the front panel. The device is now calling for data for indicator 94.

Referring to FIG. 1, the operator may now use the keyboard to enter data. He selects the appropriate data key on the keyboard 10 and holds it down. The down stroke of any data key initiates a write/read cycle in the logic such that the keyboard data is written into and read out of the memory 14 to the display 20 where it remains displayed until the data key is let up. The display indicates what is actually stored in the memory 14 so that any malfunction of the writing in or reading out operation will be immediately obvious to the operator.

When the data key is let up, a conventional function generator associated with the keyboard logic 10 (FIG. 1) advances counter 26 (FIG. 1) by 1 and then initiates a read cycle that reads and displays the data located at this next address. Initially this data will be zero due to the power up cycle. This action allows a more rapid entry of data than the more conventional adding machine type of entry where a separate "enter 38 or "+" button must be pushed. Errors may be corrected by the use of forward and reverse keys 74, 72. If the forward button 74 is pushed momentarily, a signal is generated on the down stroke that causes the address to advance up by one and a read cycle to be initiated. If the button is not let up, a counter that was initially reset to zero state on the down stroke, divides a master clock to produce a pulse every 2.34 Hz that is used to advance the address by 1 and initiate a read cycle. The time between the initial advance caused by the down stroke and the first automatic advance caused by the counter 26 is fixed at 1/2.34 sec so that multiple advances for each down stroke are avoided. This arrangement is versatile in that the operator may speed up the advances by rapid operation of the advance button or accept the more leisurely 2.34 Hz automatic advance. The reverse key 14 works in exactly the same way except that the down stroke changes the address to the previous indicator block.

If the reverse key 72 is momentarily pushed, the O in a particular indicator will extinguish and the previously entered data, in a previous indicator block, will be illuminated. If the operator desires to change that data, he may push another data key. The data written into memory 14 by this action will replace the previously entered data. The upstroke of the data key will then cause the counter 26 to advance by one and a subsequent indicator will then display data.

The operator then continues through the field of data for a given format. The initially illuminated zero in each indicator asks a specific question, e.g., target type? The operator answers each question by entering a numerical answer, e.g., 3: mortar. Once the field is full, he may verify the data in any location by use of the keys 72, 74.

There are entries in the data field that consist of several digits, for example, Distance: 3000 meters where the 3000 spans 4 indicators. There are some entries where up to 5 digits should be displayed at once. For that reason the mode switch 88 has a VRFY or verify position where the contents of the memory 14 may be viewed 5 indicators at a time. When the mode switch is changed from ENTR to VRFY, the single illuminated segment in a given indicator appears to expand to the right, encompassing data in the next 4 indicators. In this mode a read cycle is automatically initiated every 300 Hz and the address is commanded to change in accordance with a special pattern produced by the verify sequence generator 32 (FIG. 1). All data keys are deactivated and the forward and backward keys are coupled to function identically. The verify sequence generator 32 is such that it allows the up-down counter 26 to count up to 1, display, count up by 1, display, count up by 1, display, count up by 1, display, count up by 1, display hold one count, display, count down by 1, display, count down by 1, display, count down by 1, display, count down by 1, display hold one count, count up by one, display, etc., etc. In this way the display appears as 5 indicators of data illuminated with equal brilliance as the duty cycles of each are equal (each is scanned twice in each cycle). The cycle is completed every 30 Hz. If either the forward or backward keys 74, 72 are pushed, the hold count at the top of the count up portion of the cycle is changed to a count up by 1. This elimination of the hold count is only allowed to happen at a 2.34 Hz rate so that 5 illuminated indicators appear to advance at the same rate as in the enter data mode. To the operator this action appears as 5 illuminated pieces of data. If either of the keys 72, 74 are momentarily pushed, the 5 illuminated indicators move to the right by one; if either key is held down they continue to advance to the right at a 2.34 Hz rate. If the operator finds a piece of data that he wishes to change, he pushes the mode switch 88 back to the enter (ENTR) mode, and overrides the questionable data with the appropriate symbol.

The operator may transmit the message in any mode but standby (STBY). He does this by momentarily pushing the switch 90 to transmit (XMIT). The operator can observe the transmitting action from the display. The display first shows the data in indicator block 92, then scans data in the remaining indicator blocks. Once the illuminated spot has come to rest, it may be operated on by the keyboard, that is moved by the keys 72, 74, or modified by the data keys if the mode switch 88 is in the enter (ENTR) position. If this switch was in the verify (VRFY) position while the device was transmitting, the spot will expand to 5 spots when it comes to rest at the end of transmission.

If a remote data processing system was monitoring the message, it should send a signal back to the device if the data is correct. This signal may be of any conventional type used by terminals to indicate acknowledge. Thus, referring to FIG. 1, if the acknowledge signal was in the form of a radio signal received at 44, an appropriate demodulator 46 would demodulate the signal so that an acknowledge information signal could be detected by a threshold detector, such as a Schmidt trigger, 48. The detector 48 then enables a transistor driver 50 which has an output at 52 to light a LED indicator, 80 (FIG. 2) adjacent the keyboard. The operator observes this and uses the reset button 78 to reset the driver 50 which extinguishes the LED 80 readying it for the next transmission.

The operator may store any data he has entered into the device by putting the mode switch 88 in the center or standby (STBY) position. In this position, power is removed from those circuits not involved in the data storage. The display is blanked and the power consumption of the device is minimized.

In designing the display there was a definite problem in deciding where to divide the data to form the top and bottom rows of the indicator blocks (FIG. 2). The problem arises as some formats should include indicator 96 as the last element in a multi-digit entry in the top row where other formats should include the display of that indicator blocks as the first element in a multi-digit entry in the bottom row. For this reason the data for block 96 appears in two places; the last indicator block 96 in the top row, and as the first indicator block 98 in the bottom row. Both light blocks do not light simultaneously. The choice as to which one displays the data depends on which data is entered in indicator block 94, the message type entry. This data is a code for which format card is being used and therefore is appropriate for this function. The information that dictates which indicator is displayed is stored in a reserved section of the keyboard decoding matrix 12 (FIG. 1). This matrix, serves as a read-only-memory for this purpose and generates a specific output consisting of a 0 or 1 for each of the 16 possible entries from the keyboard. This sample dictates which indicator block 96 or 98 is illuminated.

As shown in FIG. 3, on the right hand side of the case are four binding posts 63, a radio connector 70, two switches 100, 102, and a potentiometer 104. The binding posts may be used to connect the output signal to either a 2 wire or 4 wire telephone system. The radio jack may be used to connect the output to a VHF radio. The potentiometer controls the amount of panel illumination provided the light switch 84 on the front panel is on. The swich 102 is marked 600/1200 and sets the output data rate to either 600 or 1200 bits per second (bps). The other switch 100 is marked NORMAL/-REPEAT and determines if the transmitted signal includes the data blocks repeated, or sent only once.

Regarding the overall electronic design, the RCA 4000A series of Complementary Metal Oxide Semiconductor (CMOS) may be chosen to implement the design so that the device would consume a minimum of power. These devices are mounted in military packages in Medium Scale Integrated (MSI) form such that their operating temperature is −55° to +125° C. The typical power consumption of this family of logic is 10 microwatts for a MSI circuit and 10 nano-watts per gate. The CMOS memory chip that was chosen consumes 500 microwatts of power.

Figure 4:
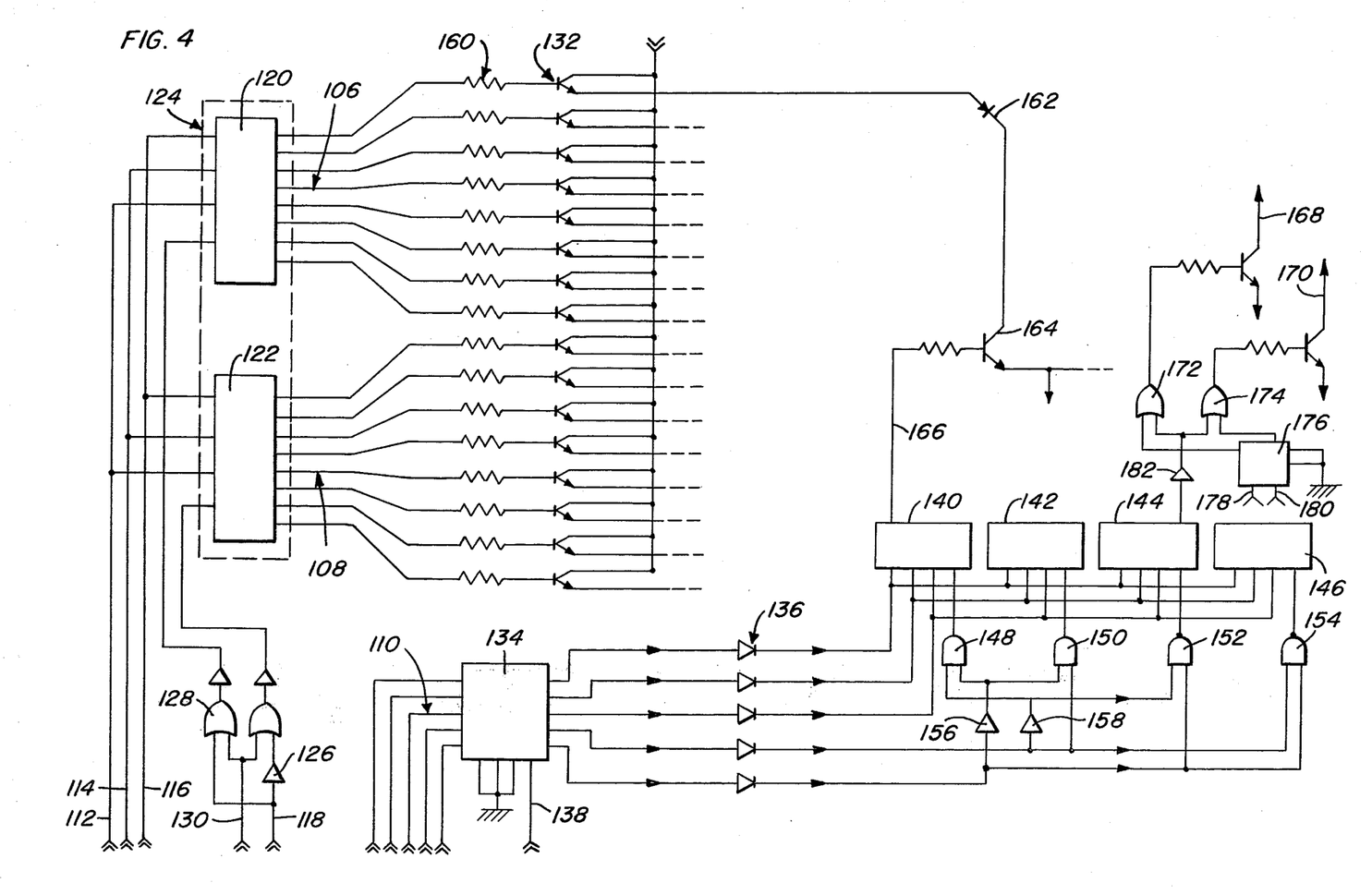
FIG. 4 is a logic diagram of the components utilized in generating a display for the present invention.

The visual part of the display 20 (FIG. 1) consists of 31 fiber optic indicator blocks shown in FIG. 3, each containing 16 light emitting diodes. Referring to FIG. 4, the diodes are connected in a 16 × 31 X–Y matrix such that data information on the line sets 106, 108, controls the X axis and the memory address at input lines 110 controls the Y axis. The matrix is capable of activating any one LED at once. This is compatible with the memory of the present invention, which is organized to access a single piece of data at once. The data input consists of the four lines 112, 114, 116 and 118, where 116 is the least significant bit. The data lines connect directly to the binary-to-decimal decoder 124, including chips 120 and 122. The eight outputs 106, 108 of each of these chips are combined to form the sixteen possible decimal data lines. Line 118 connects the inverter 126 and gate 128, that selects which of the decoder chips 120, 122 has outputs. When line 130 carries a binary 1, the decoder chips 120, 122 have no outputs. This signal, called the blanking signal, is used to ensure that the decoder chips draw no current through the emitter base diode of the driver transistors 132 when the device is in the standby mode.

The indicator address input consists of the five lines at 110 from the counter 26, collectively shown as 30 (FIG. 1). This input is buffered by register 134 and respective output inverters 136, which are connected as a five bit parallel in/parallel out register. When a timing pulse on line 138 is a logical 1, the input of the register 134 is accepted; when it is a zero, the previous address is presented at the output, and any changes on the input lines are ignored. Blanking is provided so that no current flows from the address decoder outputs when the device is in the standby mode. Decoder chips 140, 142, 144 and 146 provide the address decoding. Gates 148, 150, 152, 154 and inverters 156, 158 are used to select the appropriate decoder chip.

The driver circuitry for the LED's is seen to include a base resistor 160, in each of the line sets 106, 108. Each resistor is directly connected to the base of a respective NPN transistor 132. The collectors of the driver transistors are connected to a regulated voltage supply, typically 1.9 volts. The emitter of each transistor is connected to a separate LED 162. The total display of the invention utilizes 496 LED's, typically of the type manufactured by Monsanto, and denoted as model MV-50. The cathode of each LED is connected to a respective switching transistor 164, at the collector thereof. The base is connected, through a resistor to an output 166 of the decoder chip 140. As will be appreciated, each LED is connected to its own switching transistor, which in turn is connected to a unique output from the decoder chips 140, 142, 144, and 146. The emitter of each transistor such as 164 is returned to a ground path.

In the instance of indicator blocks 96 and 98 (FIG. 2), it has previously been mentioned that either one of these will function, while the other one remains unlit. In order to achieve this end, two separate switching transistors, 168 and 170 are connected to the cathode end of the LED's of indicator blocks 96 and 98, respectively. Respective gates 172 and 174 selectively turn on transistor 168 or 170, through enablement of a flip-flop 176. The flip-flop 176 is in turn driven by a clock lead 178 connected to the cunter 26 (FIG. 1) and a second input lead 180 which is connected to the converter 12 (FIG. 1), so that a change of state of the flip-flop only occurs in synchronism with the depression of a key on the keyboard, and when light block 94 (FIG. 2) is addressed. Decoder chip 144 simultaneously enables gates 172 and 174, when an output at the decoder chip 144 occurs for the address line associated with indicator blocks 96 and 98 (FIG. 2). An inverter 182 is provided between the chip 144 and the gates 172, 174, for purposes of matching logic.

Figure 5:
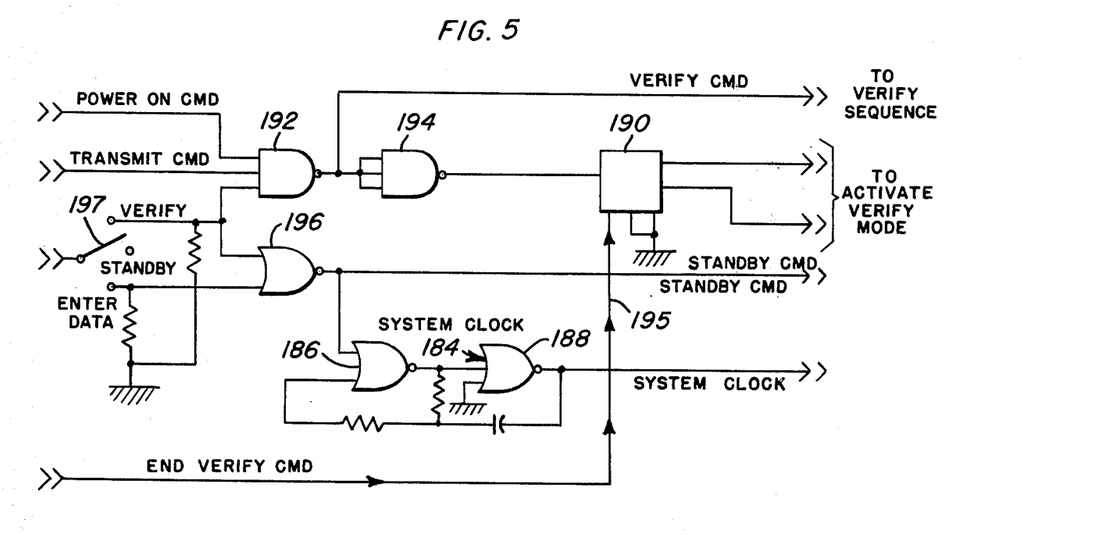
FIG. 5 is a logic diagram of a mode control circuit utilized with the present invention.

FIG. 5 illustrates the mode control circuitry, previously indicated in block form by reference character 24, in FIG. 1. As shown in FIG. 1, the keyboard 10 is connected to the mode control 24 via connection 56. Gates 186 and 188 are connected together, in a feedback fashion, which is a conventional method of constructing a system clock 184. Typically, the system clock provides an operating frequency of 19.2 khz. Flip-flop 190 controls the verify mode and will only allow the verify mode to be terminated at the end of the verify sequence. When the switch 197 (corresponding to 88 in FIG. 2) is positioned in the verify mode, a logic level 1 voltage is impressed upon the VERIFY Command line, as indicated. The output of gate 192 further drives gate 194, the output of which sets the flip-flop 190, and overrides reset pulses from the line 195, which carries an END VERIFY COMMAND, indicated in the figure. The latter-mentioned command comes on at the end of an up/down verify count which causes a visual display of five adjacent indicator blocks, as previously mentioned. However, once the switch 197, corresponding to switch 88 (FIG. 2), is switched from the VERIFY position or either the indicated power on command or transmit command fall to the 0 logic level, the flip-flop 190 will be reset by the signal at 195 which results in the termination of the verify mode. The output lines from flip-flop 190 are utilized to activate the verify mode, as will be explained hereinafter.

When switch 197 is switched to the standby position, gate 196 generates a standby command. This command signal is utilized by the remainder of the device to blank all displays. Further, it causes a reduction of power from the power supply. Still further, the command is used to disable the keyboard. A further result of the standby command is the absence of an output signal. Also, a connection of gate 196 to the input of gate 186 causes the system clock to terminate operation when in the standby mode, as evidenced by a standby command. The primary purpose of the standby command is to reduce circuit energization as much as possible, to minimize power drain, but ensuring that the memory and related circuits remain energized so that data is not lost. As indicated in FIG. 5, the gate 192 has three inputs respectively connected to:

1. a conventional circuit to indicate when the power switch 82 (FIG. 2) has been initially turned on;
2. transmit/test switch 90 (FIG. 2); and
3. the mode switch 88 (FIG. 2).

Gates 192 and 194 turn the verify mode off during a period when the power has just been applied or when the unit is transmitting. Gate 196 will only become operative when switch 197 is positioned in the standby mode.

Figure 6:
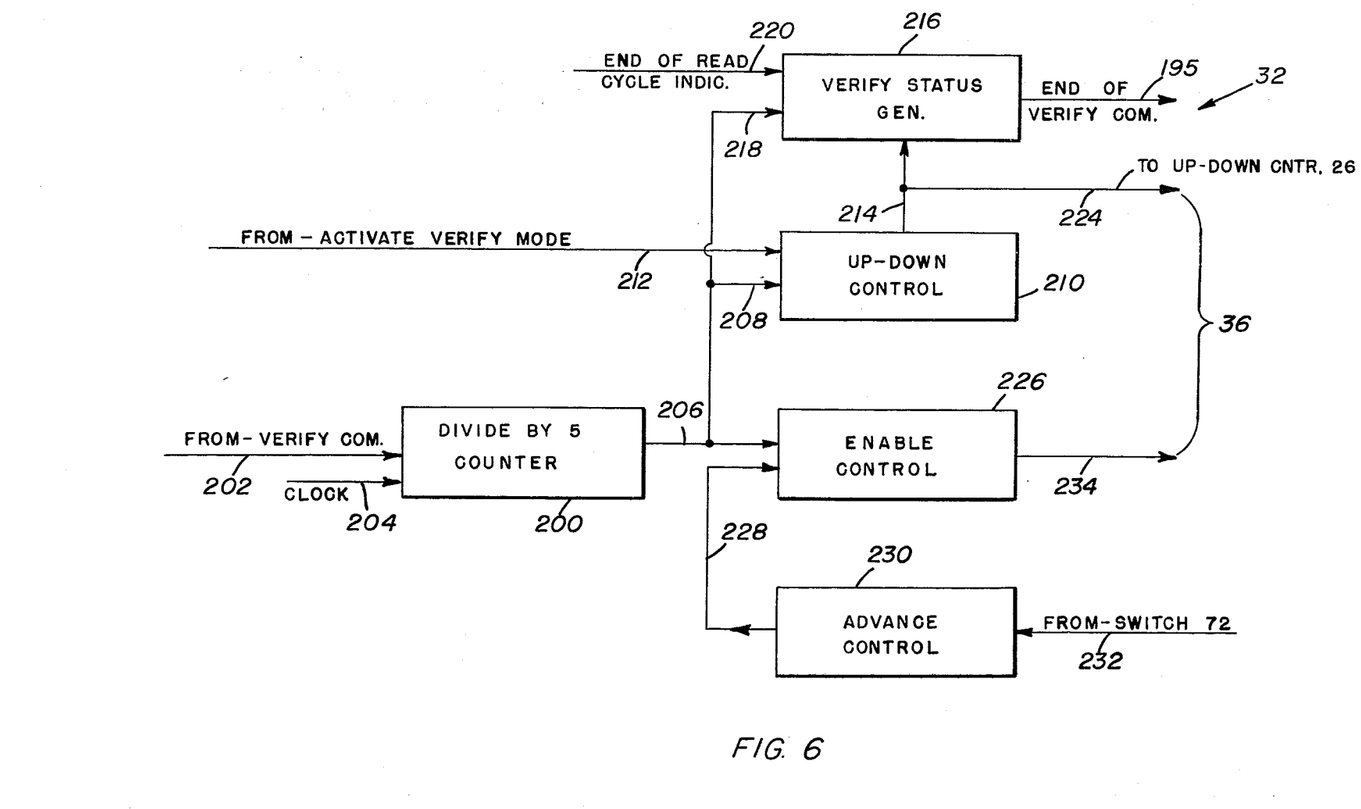
FIG. 6 is a block diagram of the verify sequence generator, as utilized in the present invention

FIG. 6 is a block diagram of the verify sequence generator 32. A divide by 5 counter 200 receives a first input 202 from the verify command line (FIG. 5). A second clock input is provided by the system clock divided to a 300 Hz rate so the five sequenced addresses appear to be constantly illuminated. The output of the counter 200 serves to indicate when five of the input clock pulses have been received. It controls the sequence by providing an output 206 to the input 208 of an up-down control 210. This control is in the nature of a flip-flop which, together with the input 212 (FIG. 5) generates an output 214, to a verify status generator 216. The up-down control 210 controls the up-down counter 26 (FIG. 1) as to which direction the counter will count. A second input 218 to the verify status generator 216 is connected to the output 206 of counter 200. A third input 220 carries signals indicative of an End Of Read Cycle Indicator, which is shown in FIG. 1 to be generated by the mode control 24. The purpose of the indicator is to signify the end of a read cycle, after the verify sequence generator 32 may be turned off. This is accomplished by the generator 216, which is a series of conventional gates, by generating an End Verify Command along lead 195, which is also shown in FIG. 5.

An output 224, from the up-down control 210 is connected to the up-down counter 26, of FIG. 1. The lead 224, in combination with the output 234 of an enable control 226 constitute the communicating line 36, in FIG. 1. The enable control 226 has a first input 206, from the counter 200. A second input to the enable control is indicated by reference numeral 228 and is generated by an advance control 230. The enable control 226 is comprised of conventional gates, while the advance control 230 is comprised of a flip-flop. The output lead 234, from the enable control 226, particularly serves to inhibit or hold the counter 26 for a portion of the verify sequence. However, upon the depression of switch 72 (FIG. 2), a signal along input 232 changes the state of the advance control 230 and in effect disables the enable control 226. Thus, although the enable control 226 inhibits the counter 26 during a regular verify sequence, during which time five sequentially located display blocks are operative, upon the depression of a switch 72, the counter 26 is allowed to advance so that the five sequentially operative display blocks are advanced by one. Immediately thereafter, the counter 26 is inhibited and will remain in such a state until switch 72 is again depressed, after which the counter 26 is enabled to actuate the next five successive display blocks, incremented by 1. Thus, in essence, when a forward switch 72 is depressed, it allows the enable control 226 to advance the counter 26 by 1.

It should be understood that the invention is not limited to the exact details of construction shown and described herein for obvious modifications will occur to persons skilled in the art.

We claim as our invention:

1. In a data entry and storage system comprising: display means including a multiplicity of indicator blocks each including a plurality of segments of fiber optic material bonded together and a like plurality of individual light-emitting diodes juxtaposed with corresponding ones of said segments;

selectable loosely bound format cards having openings therein through which said indicator blocks pass, said format cards each having a column of indicia imprinted thereupon for each of the indicator blocks to identify the significance of individual light-emitting diodes, said format cards being selected to establish each of the indicator blocks as an indicator of distinctive types of data;

storage means having a number of discrete storage locations;

keyboard means having a plurality of keys selectably actuated one at a time in sequence for presenting data to a distinct location of said storage means for each key actuation which data is in accordance with the particular item of columnar indicia to be selected for each of said columns in the order in which the columns are arranged on said format cards; and means connected to said storage means for selectively energizing, for each indicator block, that individual light-emitting diode which corresponds to the actuated key to visually display the entered data.

2. The system set forth in claim 1 further including:
   means for converting electrical signals derived during actuation of said keys to a preselected code format; and
   means for coupling said code format to said storage means.

3. The system as set forth in claim 1 further including logic circuitry for actuating a light-emitting diode of an indicator block of said display means during key depression and for actuating a light-emitting diode of the next indicator block of said display means upon release of the depressed key.

4. The system set forth in claim 1 wherein said keyboard means includes a forward key and a reverse key for activating a light-emitting diode of an adjacent indicator block during depression of said forward or reverse key.

5. The system as set forth in claim 4 including output means connected to said storage means for permitting transmission of the data entered therein to a remote location.

6. The system set forth in claim 5 further including means for receiving an acknowledge signal from the remote location, and indicator means located adjacent to the keyboard for indicating the presence of said acknowledge signal.

7. The system according to claim 1 further including means for generating a verification sequence for presenting data from said storage means simultaneously to a light-emitting diode of a preselected number of sequentially disposed indicator blocks.

8. A system according to claim 7 further including encoding means connected to an output of the storage means for encoding the data in a preselected code format suitable for transmission to a remote location.

9. The system as set forth in claim 1 comprising switching means connected between a source of power and said storage means for maintaining energization of the storage means and deenergization of the display means during a standby mode wherein the entered data remains intact in the storage means.

10. The system as set forth in claim 1 wherein
the said display means includes first decoding means connected at its input to said storage means for generating unique signals and the output thereof corresponding to respective data inputs;
each of said light-emitting diodes being connected to a respective output of said decoding means;
said switching means being connected to each of the light-emitting diodes to complete a current path therethrough for selectively energizing the light-emitting diodes;
second decoding means connected at its output to said switching means for generating a unique output which enables a particular switching means at a given moment; and
means including counter means connected to the input of said second decoding means for generating unique address codes at the input of said second decoding means as different data is entered on said keyboard means.

11. The system of claim 10 including driver means connected between each output of said first decoding means and respective light-emitting diodes.

* * * * *